(12) United States Patent
Choi et al.

(10) Patent No.: US 11,476,896 B2
(45) Date of Patent: Oct. 18, 2022

(54) METHOD FOR TRANSMITTING POWER USING METASURFACE IN WIRELESS COMMUNICATION SYSTEM

(71) Applicant: RESEARCH & BUSINESS FOUNDATION SUNGKYUNKWAN UNIVERSITY, Suwon-si (KR)

(72) Inventors: Kae Won Choi, Suwon-si (KR); Nguyen Minh Tran, Suwon-si (KR); Muhammad Miftahul Amri, Suwon-si (KR); Dong In Kim, Suwon-si (KR); Je Hyeon Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 230 days.

(21) Appl. No.: 17/088,940

(22) Filed: Nov. 4, 2020

(65) Prior Publication Data
US 2021/0175931 A1 Jun. 10, 2021

(30) Foreign Application Priority Data
Dec. 10, 2019 (KR) .......................... 10-2019-0163992

(51) Int. Cl.
- *H04B 5/00* (2006.01)
- *H02J 50/40* (2016.01)
- *H02J 50/80* (2016.01)

(52) U.S. Cl.
CPC .......... *H04B 5/0037* (2013.01); *H02J 50/402* (2020.01); *H02J 50/80* (2016.02)

(58) Field of Classification Search
CPC ........ H04B 5/0037; H02J 50/80; H02J 50/402

USPC .......................................................... 307/149
See application file for complete search history.

(56) References Cited

U.S. PATENT DOCUMENTS

| | | | |
|---|---|---|---|
| 10,236,574 B2 | 3/2019 | Chen et al. | |
| 2017/0069973 A1* | 3/2017 | Black | H01Q 21/061 |
| 2018/0321375 A1* | 11/2018 | Urzhumov | G01S 13/89 |

(Continued)

FOREIGN PATENT DOCUMENTS

| | | |
|---|---|---|
| KR | 10-2014-0005739 B1 | 1/2014 |
| KR | 10-2018-0057006 A | 11/2016 |

OTHER PUBLICATIONS

Korean Office Action dated Jul. 28, 2021 in counterpart Korean Patent Application No. 10-2019-0163992 (2 pages in Korean).

*Primary Examiner* — Alfonso Perez Borroto
(74) *Attorney, Agent, or Firm* — NSIP Law

(57) ABSTRACT

A power transmitting method of a wireless communication system includes a metasurface. The method includes transmitting power of a power supply device to a target device through the metasurface comprising N cells, where N is an integer; estimating, by the metasurface, a channel between the metasurface and the target device based on the power received by the target device and a property matrix with a magnitude of (N+1)×(N+1); adjusting, by the metasurface, a phase of each cell of the N cells based on the estimated channel; and reflecting, by the metasurface, the power transmitted from the power supply device to the target device using the adjusted phase of each cell of the N cells. The property matrix includes information indicating whether each cell of the N cells is turned on and information about a bias value of the wireless communication system.

13 Claims, 8 Drawing Sheets

(56) References Cited

U.S. PATENT DOCUMENTS

2019/0089055 A1* 3/2019 Arnitz ................. H01Q 15/148
2019/0140350 A1* 5/2019 Urzhumov ............... H01Q 3/26

* cited by examiner

METHOD FOR TRANSMITTING POWER USING METASURFACE IN WIRELESS COMMUNICATION SYSTEM

CROSS-REFERENCE TO RELATED APPLICATIONS

This application claims the benefit under 35 USC 119(a) of Korean Patent Application No. 10-2019-0163992 filed on Dec. 10, 2019, in the Korean Intellectual Property Office, the entire disclosure of which is incorporated herein by reference for all purposes.

BACKGROUND

1. Field

The following description relates to a method for transmitting power using a metasurface in a wireless communication system.

2. Description of Related Art

Due to the increasing number of wireless and mobile devices, charging these devices have become an important issue and is currently attracting a lot of attention. In the near future, more IoT devices will be developed and commercialized and how to supply sufficient power to the IoT devices may become desired. In terms of installation cost and maintenance, the efficiency of a wired power source or a battery exchanging method is significantly lower. In the field of wireless power transmission, specifically, microwave power transmission technology, power can be wirelessly transmitted to a distant electronic device making microwave power transmission technique a more suitable technique for charging the IoT devices.

One of the biggest challenges of microwave power transmission technology is how to concentrate the transmitted electromagnetic wave at a small receiving point. Recently, development and utilization of a metasurface using digital bit coding has emerged as a technique capable of performing beam focusing, multi-beam, scattering, or the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power transmitting method of a wireless communication system includes a metasurface. The method includes transmitting power of a power supply device to a target device through the metasurface comprising N cells, where N is an integer; estimating, by the metasurface, a channel between the metasurface and the target device based on the power received by the target device and a property matrix with a magnitude of (N+1)×(N+1); adjusting, by the metasurface, a phase of each cell of the N cells based on the estimated channel; and reflecting, by the metasurface, the power transmitted from the power supply device to the target device using the adjusted phase of each cell of the N cells. The property matrix includes information indicating whether each of the N cells is turned on and information about a bias value of the wireless communication system.

A first row to an N-th row of the property matrix may correspond to a pattern of the metasurface and the pattern may be determined based on whether each of the N cells is turned on.

Each row and each column of the property matrix may form an orthogonal relationship and the property matrix may include only a first value and a second value.

The bias value may be determined based on the power received by the target device by turning on or turning off each of the N cells.

The adjusting of the phase may include dividing the estimated channel into a first channel value between the metasurface and the target device and a second channel value for the bias value, extracting a third channel value, between a first cell of the metasurface and the target device, from the first channel value, determining a first conjugate phase of the third channel value and a second conjugate phase of the second channel value, determining a necessary phase adjustment value for the first cell based on a difference of the first conjugate phase and the second conjugate phase, and turning on or turning off the first cell based on the necessary phase adjustment value.

The wireless communication system may transmit millimeter wave frequencies, and the power supply device and the target device may be configured to perform beamforming.

In another general aspect, a wireless communication system for power transmission, includes a power supply device, a target device, and a metasurface. The power supply device is configured to transmit power. The target device is configured to receive the power transmitted. The metasurface, includes N cells where N is an integer, is configured to reflect the power received from the power supply device to the target device, estimate a channel between the metasurface and the target device based on the power received by the target device and a property matrix with a magnitude of (N+1)×(N+1), adjust a phase of each cell based on the estimated channel, and reflect the power transmitted from the power supply device to the target device using the adjusted phase of each cell of the N cells. The property matrix includes information indicating whether each cell of the N cells is turned on and information about a bias value of the wireless communication system.

A first row to an N-th row of the property matrix may correspond to a pattern of the metasurface and the pattern is determined based on whether each of the N cells is turned on.

Each row and each column of the property matrix may form an orthogonal relationship and the property matrix comprises only a first value and a second value.

The bias value may be determined based on the power received by the target device by turning on or turning off each of the N cells.

The metasurface may be configured to divide the estimated channel into a first channel value between the metasurface and the target device and a second channel value for the bias value, extract a third channel value, between a first cell of the metasurface and the target device, from the first channel value, determine a first conjugate phase of the third channel value and a second conjugate phase of the second channel value, determine a necessary phase adjustment value for the first cell based on a difference of the first conjugate phase and the second conjugate phase, and turn on or turn off the first cell based on the necessary phase adjustment value.

The wireless communication system may be configured to transmit millimeter wave frequencies, and the power supply device and the target device are configured to perform beamforming.

The metasurface may include a phase adjusting unit configured to adjust a reflection coefficient phase of each of the N cells to 0° or 180°, and the N cells are each of a same size, a length of each of the N cells is smaller than ¼ of a wavelength of an electromagnetic wave reflected by the metasurface, and each of the N cells has a fractal structure.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
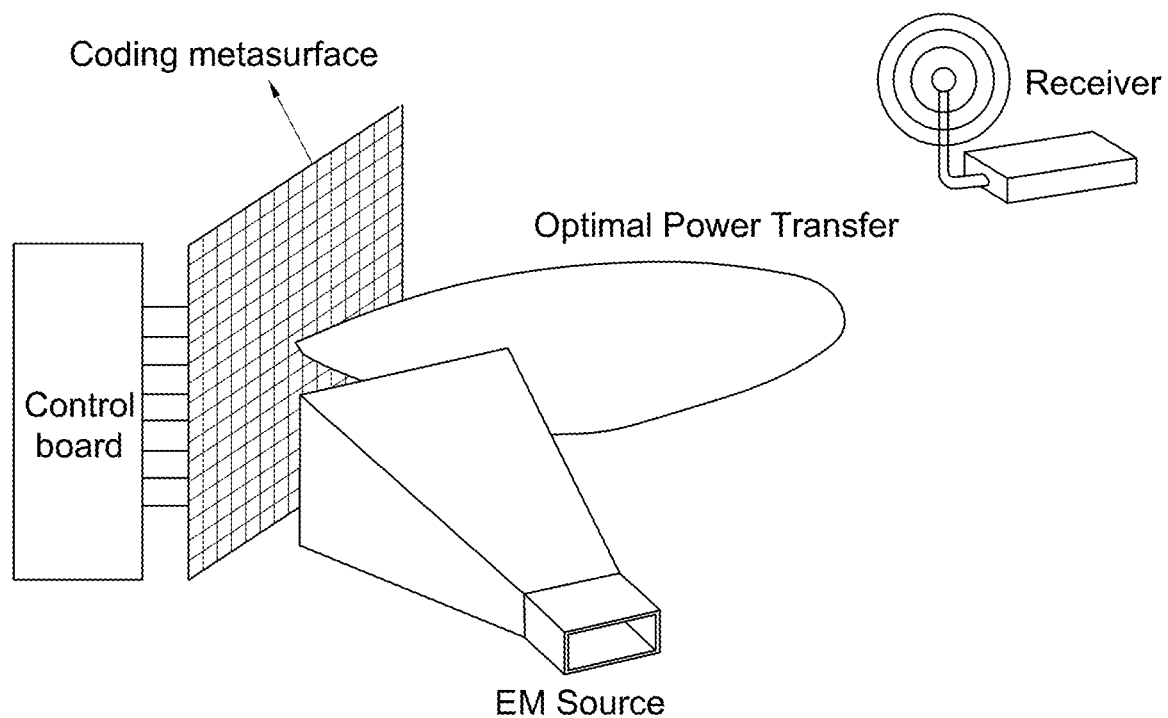
FIG. 1 is an example of a conceptual view of a power transmission system using a metasurface.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is an example of a conceptual view of a power transmission system using a metasurface.

According to one or more examples, a power transmission system may include a power supply device, a metasurface, and a target device. In one or more examples, the metasurface may receive an electromagnetic wave (EM source) from the power supply device and a phase of the metasurface is adjusted by a control board to reflect the electromagnetic wave received from the power supply device.

According to one or more examples, the metasurface may transmit the electromagnetic wave, received from the power supply device, to the target device (receiver) by adjusting the phase. In one or more examples, in a next-generation communication system that uses an mm-frequency band, straightness of a radio wave becomes strong so that a radio wave transmission distance may be shortened. That is, it may be difficult to directly transmit the power from the power supply device to the target device. Accordingly, in order to solve the problems as described above, the present disclosure proposes a method that disposes a metasurface between the power supply device and the target device to relay the power transmission, thereby improving a power transmission efficiency.

Figure 2:
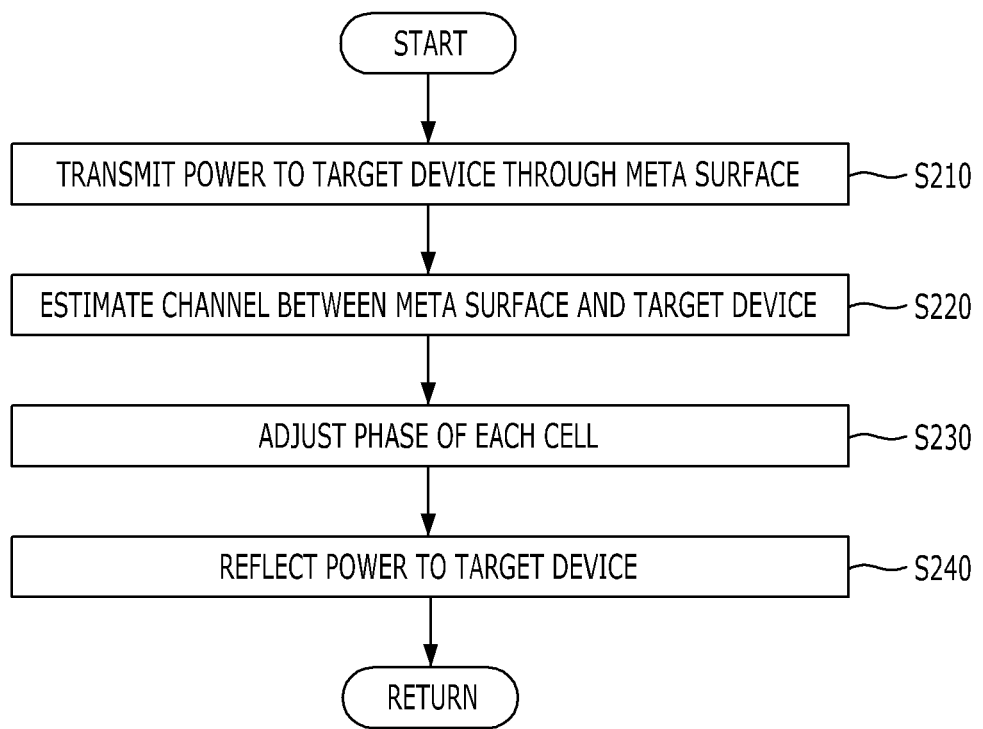
FIG. 2 is a flow chart of an example of a power transmitting method.

FIG. 2 is a flow chart of an example of a power transmitting method. According to one or more examples, a power transmitting method illustrated in FIG. 2 may be performed by a device that configures the power transmission system illustrated in FIG. 1.

According to one or more examples, in operation S210, the power supply device may transmit the power to the target device, through the metasurface. In one or more examples, the metasurface may be configured to have N unit cells of the same size. A more detailed structure of the metasurface will be further described below with reference to FIGS. 5A and 5B.

According to one or more examples, in operation S220, the metasurface may estimate a channel between the metasurface and the target device, based on a reception power that is received by the target device and a property matrix with a magnitude of (N+1)×(N+1). In one or more examples, when the metasurface includes $N^2$ (N×N) unit cells, the reception power received by the target device may be determined by the following Equation 1.

$$y = \sum_{i=1}^{N^2} h_i x_i + g + c \qquad \text{Equation 1}$$

In Equation 1, y refers to a reception power received by the target device, g is a Gaussian noise, c is a bias value of a wireless communication system, $h_i$ is a channel between an i-th unit cell and the target device, and $x_i$ is an i-th unit cell.

In an example, the bias value is not controlled by the metasurface but may be a unique value of the power transmission system that is determined by characteristics of the power supply device and the target device. In one or more examples, the bias value may be determined by a power received by the target device when all cells that configure the metasurface are turned on or off.

In an example, the property matrix with a magnitude of (N+1)×(N+1) may include information about an activation pattern for $N^2$ unit cells and information about the bias value. In one or more examples, entries of the property matrix from a first row to an N-th row and from a first column to an N-th column may be determined based on the activation pattern of the unit cell. For example, when the first unit cell is turned on, an entry of the property matrix corresponding to the first unit cell may be +1 and when the second unit cell is turned off, an entry of the property matrix corresponding to the second unit cell may be −1.

In an example, in the property matrix, an N+1-th row and the N+1-th column may be entries for determining the bias value. Consequently, the property matrix of the metasurface including $N^2$ unit cells described above may be represented by the following Equation 2.

$$\begin{pmatrix} y_1 \\ y_2 \\ \vdots \\ y_{N^2+1} \end{pmatrix} = \begin{pmatrix} b_{1,1} & b_{1,2} & \cdots & b_{1,N^2+1} \\ b_{2,1} & b_{2,2} & \cdots & b_{2,N^2+1} \\ \vdots & \vdots & \ddots & \vdots \\ b_{N^2+1,1} & b_{N^2+1,2} & \cdots & b_{N^2+1,N^2+1} \end{pmatrix} \begin{pmatrix} h_1 \\ h_2 \\ \vdots \\ h_{N^2+1} \end{pmatrix} + \begin{pmatrix} g_1 \\ g_2 \\ \vdots \\ g_{N^2+1} \end{pmatrix} \qquad \text{Equation 2}$$

In Equation 2, y is a reception power that is received by the target device, g is a Gaussian noise, h is a channel between the unit cell and the target device, and a matrix including entries b is a property matrix. In one or more examples, in the property matrix, each row from a first row $b_{1,1}, b_{1,2}, \ldots, b_{1,N^2+1}$ to an N-th row ($b_{N,1}, b_{N,2}, \ldots, b_{N,N^2+1}$) may correspond to an activation pattern of the metasurface. That is, as described above, when a unit cell of the metasurface corresponding to an entry $b_{1,1}$ is turned on, the entry $b_{1,1}$ may be 1.

In an example, in Equation 2, $h_{N^2+1}$ may be a channel value for the bias value and the bias value may be determined based on entries of an N+1-th row and an N+1-th column of the property matrix. In one or more examples, rows and columns that configure the property matrix may form an orthogonal relationship.

Further, as mentioned above, the present disclosure discloses a metasurface control method based on a one-bit digital signal so that the entries of the property matrix, according to the present disclosure, may have only two types of values. That is, a reflection coefficient phase of a metasurface according to the present disclosure only is 0° when a cell is turned on and 180° when a cell is turned off so that the property matrix only has a first value (1 as mentioned in the above embodiment) corresponding to the reflection coefficient phase of 0° and a second value (−1 as mentioned in the above embodiment) corresponding to the reflection coefficient phase of 180°.

For better understanding, when a metasurface having $4^2$ unit cells is assumed and an activation pattern for the unit cell is represented by the following Equation 3, the property matrix of the metasurface may be represented by the following Equation 4.

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \qquad \text{Equation 3}$$

$$B = \begin{pmatrix} 1 & 1 & 1 & 1 & 1 \\ 1 & -1 & 1 & -1 & 1 \\ 1 & 1 & -1 & -1 & 1 \\ 1 & -1 & -1 & 1 & 1 \\ -1 & -1 & -1 & -1 & 1 \end{pmatrix} \qquad \text{Equation 4}$$

Here, B is a property matrix and the property matrix B may be a symmetrical and invertible matrix.

In an example, when the Gaussian noise is assumed as 0 in the above Equation 2, a channel between the unit cell and the target device may be estimated as represented in the following Equation 5.

$$\begin{pmatrix} h_1 \\ h_2 \\ \vdots \\ h_{N^2+1} \end{pmatrix} = \begin{pmatrix} b_{1,1} & b_{1,2} & \cdots & b_{1,N^2+1} \\ b_{2,1} & b_{2,2} & \cdots & b_{2,N^2+1} \\ \vdots & \vdots & \ddots & \vdots \\ b_{N^2+1,1} & b_{N^2+1,2} & \cdots & b_{N^2+1,N^2+1} \end{pmatrix}^{-1} \begin{pmatrix} y_1 \\ y_2 \\ \vdots \\ y_{N^2+1} \end{pmatrix} \quad \text{Equation 5}$$

In Equation 5, y is a reception power that is received by the target device, h is a channel between the unit cell and the target device, and a matrix including entries b is a property matrix.

In an example, in operation S230, the metasurface may adjust a phase of each cell based on the estimated channel. In one or more examples, the metasurface may turn on or turn off each cell based on the estimated channel to adjust the reflection coefficient phase of each cell to be 0° or 180°. A more specific method for adjusting a phase of each cell based on the estimated channel will be further described below with reference to FIG. 3.

In an example, in operation S240, the metasurface may reflect the power transmitted from the power supply device to the target device using each cell with an adjusted phase. In one or more examples, the metasurface may be controlled based on the power received by the target device to actively improve a power efficiency of the power transmission system.

Figure 3:
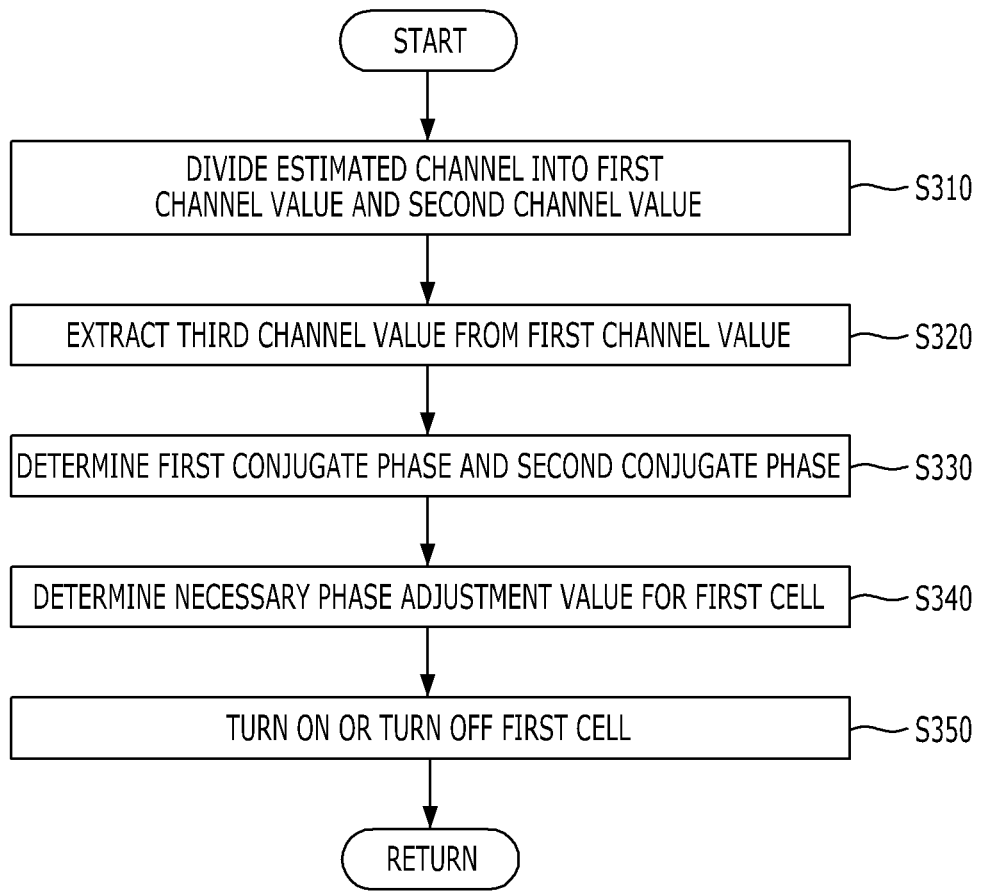
FIG. 3 is a flow chart illustrating an example of a phase adjusting method of a cell.

FIG. 3 is a flow chart illustrating an example of a phase adjusting method of a cell. According to one or more examples, a power transmitting method illustrated in FIG. 2 may be performed by a device that configures the power transmission system illustrated in FIG. 1.

In an example, in operation S310, the metasurface may divide a channel estimated in operation S220 into a first channel value that is a channel value between the metasurface and the target device and a second channel value that is a channel value for the bias value. In one or more examples, the channel h that is estimated in operation S220 may be represented by $h=(h_1, h_2, \ldots, h_{N^2+1})$ and the channel h is a complex number that has a magnitude and a phase. In the meantime, the first channel value $h_M$ may be represented by $h_M=(h_1, h_2, \ldots, h_{N^2})$ and the second channel value $h_c$ may be represented by $h_c=h_{N^2+1}$.

According to one or more examples, in operation s320, a third channel value that is a channel value between a first cell that configures the metasurface and the target device may be extracted from the first channel value. According to the above-described example, a channel value $h_1$ corresponding to the first cell may be extracted from the first channel value $h_M$ as a third channel value.

In an example, in operation S330, a first conjugate phase that is a conjugate phase of the third channel value and a second conjugate phase that is a conjugate phase of the second channel value may be determined. According to the above-described example, when the third channel value is $h_1$ and the second channel value is $h_c$, $\angle h_1^*$ may be the first conjugate phase and $\angle h_c^*$ may be the second conjugate phase.

In an example, in operation S340, a necessary phase adjustment value for the first cell may be determined based on a difference between the first conjugate phase and the second conjugate phase. According to the above-described example, the necessary phase adjustment value may be determined based on the following Equation 6.

$$\varphi_n = \angle h_1^* - \angle h_c^* \quad \text{Equation 6:}$$

Here, $\varphi_n$ is a necessary phase adjustment value, $\angle h_1^*$ is a first conjugate phase, and $\varphi h_c^*$ is a second conjugate phase.

In an example, in operation S350, the first cell may be turned on or turned off based on the necessary phase adjustment value. As mentioned above, the present disclosure uses a one-bit digital coding metasurface unit cell so that the reflection coefficient phase of the unit cell may be adjusted to 0° or 180° in accordance with the condition of the following Equation 7.

$$\hat{\varphi}_n = \begin{cases} \pi & \text{if } \pi/2 \leq \varphi_n \leq 3\pi/2 \\ 0 & \text{elsewhere} \end{cases} \quad \text{Equation 7}$$

Here, $\hat{\varphi}_n$ is a reflection coefficient phase and $\varphi_n$ is a necessary phase adjustment value.

In an example, an electromagnetic wave that is radiated with a phase of $\varphi_n$ from each cell may eliminate a mutual phase difference by the process described in the present disclosure and thus, the power is concentrated in a desired direction toward the target device so that a power transmission efficiency of the wireless communication system may be improved.

Figure 4:
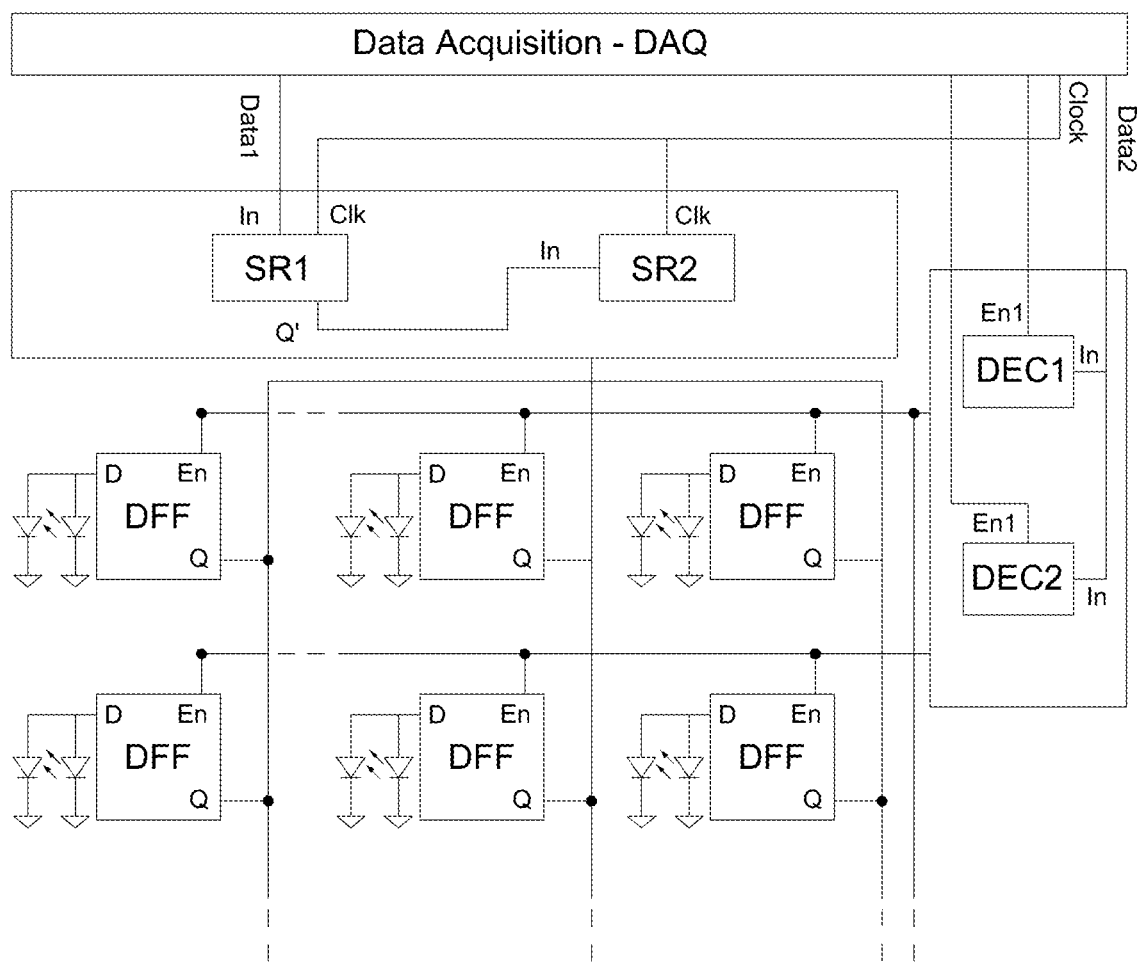
FIG. 4 is a block diagram illustrating an example of a phase adjusting unit which configures a metasurface.

FIG. 4 is a block diagram illustrating an example of a phase adjusting unit that configures a metasurface.

According to one example, the metasurface according to the present disclosure may include a phase adjusting unit that adjusts a reflection coefficient phase of each cell that configures the metasurface to be 0° or 180°. In one or more examples, when the metasurface includes a total of 256 (16×16) unit cells, the phase adjusting unit may independently control 256 output pins to control the phase of each unit cell.

In an example, in order to reduce the wiring complexity of the phase adjusting unit and independently input data for each row, two 8-bit shift registers SR1 and SR2 may be used. In one or more examples, the data is stored in a D-flipflop (DFF) and decoders DEC1 and DEC2 may activate two to eight line decoders. Accordingly, the phase adjusting unit may select a desired row through a structure illustrated in FIG. 4 to independently load the data to the desired row. According to one or more examples, the phase adjusting unit may control an on/off state of all cells configured in a metasurface array to be a desired state and input data may be transmitted through a DAQ that is controlled by a LabVIEW program.

Figure 5A:
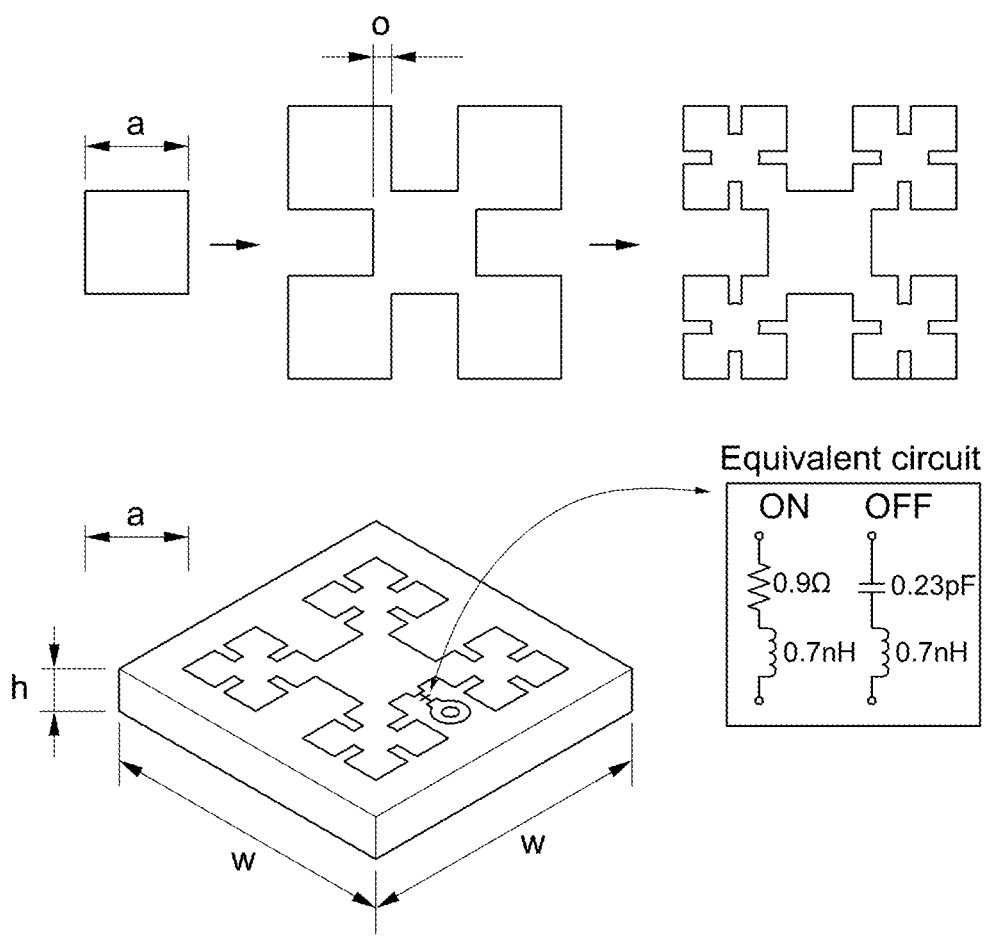
FIG. 5A is a view illustrating an example of a unit cell which configures a metasurface.

FIG. 5A is a view illustrating an example of a unit cell that configures a metasurface.

Since the metasurface disclosed in the present disclosure is a metasurface to which one-bit digital coding is applied, the reflection coefficient phase of the metasurface may be 0° or 180°. Further, in an example of the present disclosure, the reflection coefficient phase may be adjusted as needed. In an example, the reflection coefficient phase of the metasurface may be adjusted to be 0° or 180° by a PIN diode configured in each unit cell. In one or more examples, the metasurface may be configured by unit cells with the same size and a length w of each unit cell may be smaller than ¼ of a wavelength of an electromagnetic wave reflected by the metasurface and each unit cell may have a fractal structure.

According to one example, the unit cell that configures the metasurface may be designed such that squares (segments) with the same length a are disposed at four points with offsets o and four squares are replaced with a first repeated overall structure. In the fractal structure illustrated in FIG. 5A, a length $L_n$ of one edge may be calculated by the following Equation 8.

$$L_n = a + 4(a_n - o), \text{ with } n \geq 1 \quad \text{Equation 8:}$$

Here, $a_n$ is a length of n-times repeated squares and is defined as $$a_n = 4\left(\frac{a}{2^{n-1}} - \frac{o}{2^{n-1}}\right).$$

In an example, when the unit cell is designed, the length of the edge and the number of repeating times need to be determined in advance. In one or more examples, the length of the edge of the unit cell may be a half the wavelength of the electromagnetic wave used to transmit the power.

Figure 5B:
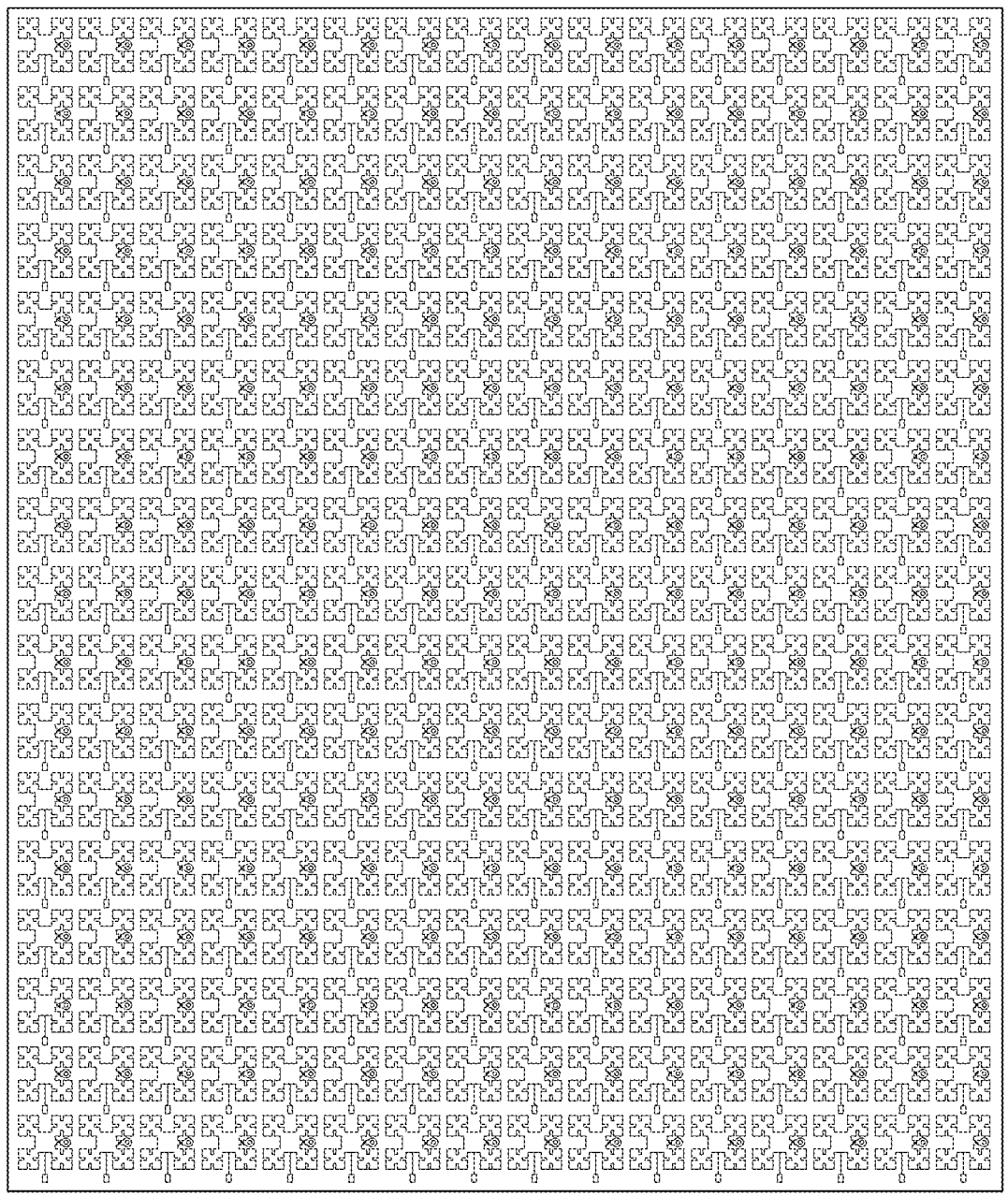
FIG. 5B is a view illustrating an example of a metasurface.

FIG. 5B is a view illustrating an example of a metasurface. More specifically, FIG. 5B is a view illustrating a metasurface including 256 (16×16) unit cells illustrated in FIG. 5A.

Figure 6:
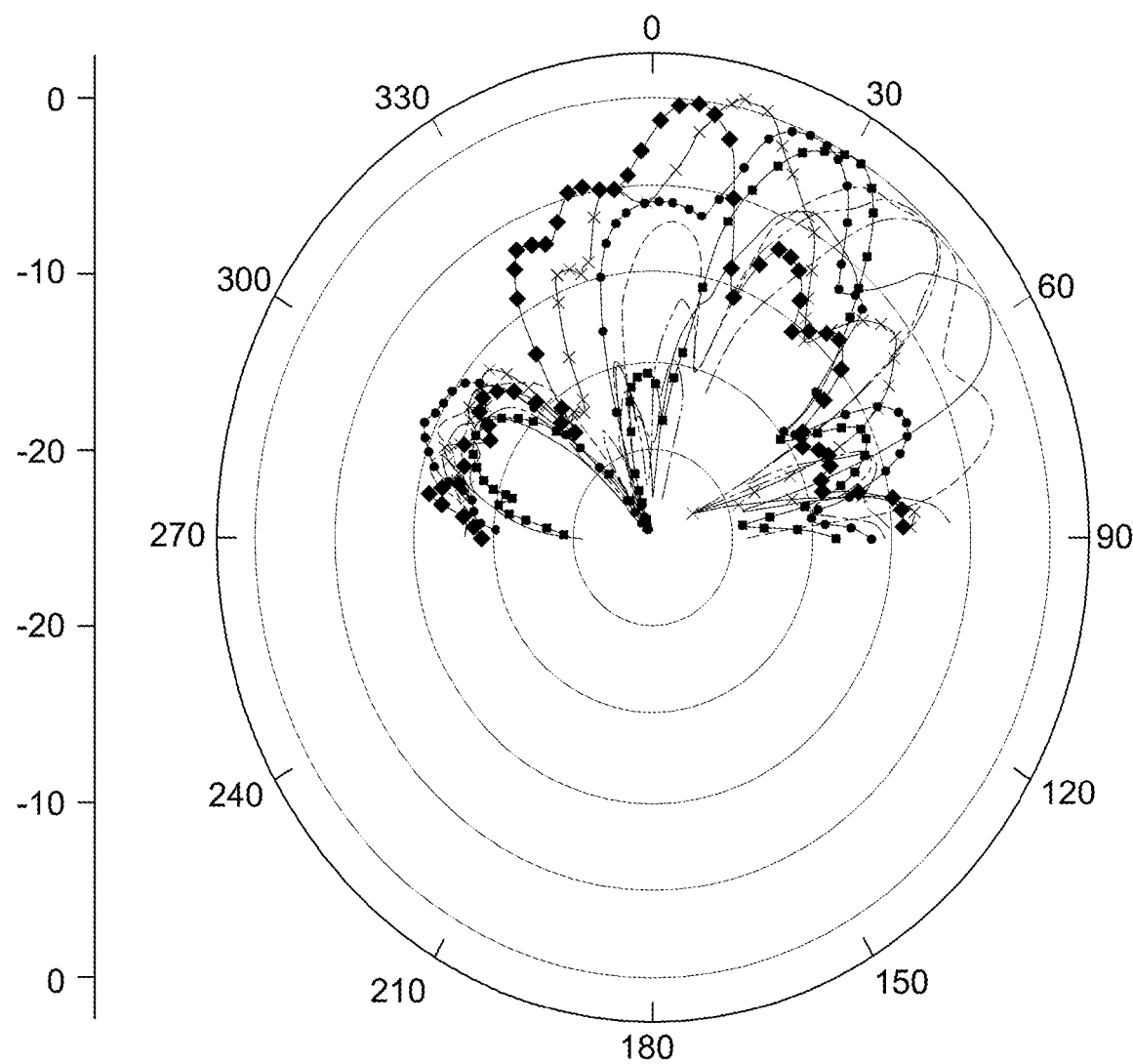
FIG. 6 is a graph illustrating an example of a beam steering performance of a power transmission system.

FIG. 6 is a graph illustrating an example of a beam steering performance of a power transmission system. According to one example disclosed in the present disclosure, it is confirmed that an angle formed by a beam reflected by the metasurface is similar to an angle to be reflected. That is, it is confirmed by the graph of FIG. 6 that the metasurface is controlled so that the power transmitted from the power supply device may be steered to a direction desired by the user.

Figure 7:
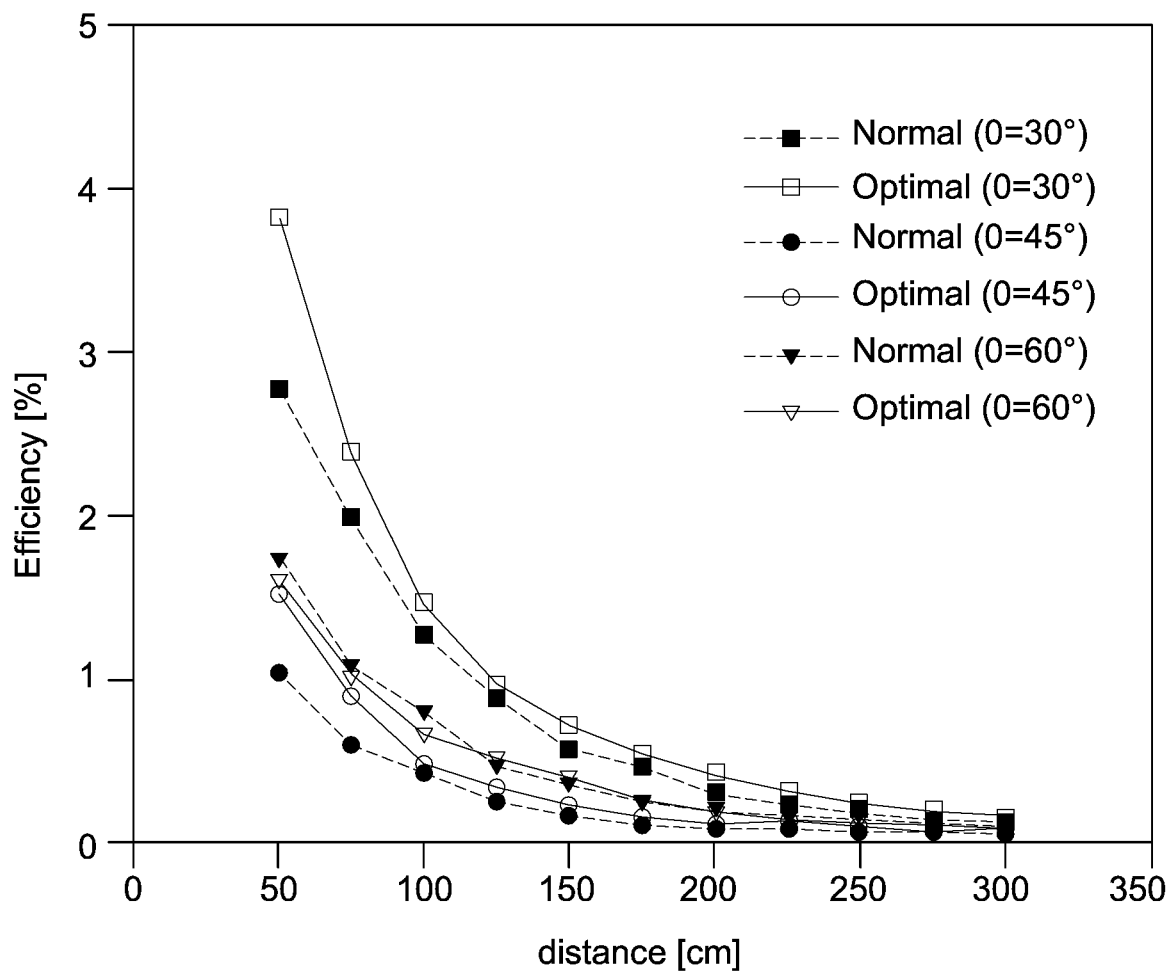
FIG. 7 is a graph illustrating an example of a power transmission efficiency of a power transmission system.

FIG. 7 is a graph illustrating an example of a power transmission efficiency of a power transmission system. It is confirmed by the graph of FIG. 7 that the power efficiency by the power transmission system structure according to the present disclosure is higher than the power efficiency by the power transmission system structure of the related art.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power transmitting method of a wireless communication system including a metasurface comprising N cells where N is an integer, the method comprising:
    transmitting, by a power supply device, power to a target device through the metasurface;
    estimating, by the metasurface, a channel between the metasurface and the target device based on the power received by the target device and a property matrix with a magnitude of (N+1)×(N+1);
    adjusting, by the metasurface, a phase of each cell of the N cells based on the estimated channel; and
    reflecting, by the metasurface, the power transmitted from the power supply device to the target device using the adjusted phase of each cell of the N cells,
    wherein the property matrix includes information indicating whether each cell of the N cells is turned on and information about a bias value of the wireless communication system.

2. The power transmitting method of claim 1, wherein a first row to an N-th row of the property matrix corresponds to a pattern of the metasurface and the pattern is determined based on whether each of the N cells is turned on.

3. The power transmitting method of claim 1, wherein each row and each column of the property matrix form an orthogonal relationship and the property matrix comprises only a first value and a second value.

4. The power transmitting method of claim 1, wherein the bias value is determined based on the power received by the target device by turning on or turning off each of the N cells.

5. The power transmitting method of claim 1, wherein the adjusting of the phase includes:
    dividing the estimated channel into a first channel value between the metasurface and the target device and a second channel value for the bias value;
    extracting a third channel value, between a first cell of the metasurface and the target device, from the first channel value;
    determining a first conjugate phase of the third channel value and a second conjugate phase of the second channel value;
    determining a necessary phase adjustment value for the first cell based on a difference of the first conjugate phase and the second conjugate phase; and
    turning on or turning off the first cell based on the necessary phase adjustment value.

6. The power transmitting method of claim 1, wherein the wireless communication system transmits millimeter wave frequencies, and the power supply device and the target device are configured to perform beamforming.

7. A wireless communication system for power transmission, comprising:
    a power supply device configured to transmit power;
    a target device configured to receive the power transmitted; and
    a metasurface, comprising N cells where N is an integer, configured to reflect the power received from the power supply device to the target device, estimate a channel between the metasurface and the target device based on the power received by the target device and a property matrix with a magnitude of (N+1)×(N+1), adjust a phase of each cell based on the estimated channel, and reflect the power transmitted from the power supply device to the target device using the adjusted phase of each cell of the N cells,
    wherein the property matrix includes information indicating whether each cell of the N cells is turned on and information about a bias value of the wireless communication system.

8. The wireless communication system of claim 7, wherein a first row to an N-th row of the property matrix corresponds to a pattern of the metasurface and the pattern is determined based on whether each of the N cells is turned on.

9. The wireless communication system of claim 7, wherein each row and each column of the property matrix form an orthogonal relationship and the property matrix comprises only a first value and a second value.

10. The wireless communication system of claim 7, wherein the bias value is determined based on the power received by the target device by turning on or turning off each of the N cells.

11. The wireless communication system of claim 7, wherein the metasurface is configured to
- divide the estimated channel into a first channel value between the metasurface and the target device and a second channel value for the bias value,
- extract a third channel value, between a first cell of the metasurface and the target device, from the first channel value,
- determine a first conjugate phase of the third channel value and a second conjugate phase of the second channel value,
- determine a necessary phase adjustment value for the first cell based on a difference of the first conjugate phase and the second conjugate phase, and
- turn on or turn off the first cell based on the necessary phase adjustment value.

12. The wireless communication system of claim 7, wherein the wireless communication system is configured to transmit millimeter wave frequencies, and the power supply device and the target device are configured to perform beamforming.

13. The wireless communication system of claim 7, wherein the metasurface includes a phase adjusting unit configured to adjust a reflection coefficient phase of each of the N cells to 0° or 180°, and the N cells are each of a same size, a length of each of the N cells is smaller than ¼ of a wavelength of an electromagnetic wave reflected by the metasurface, and each of the N cells has a fractal structure.

* * * * *